Patented Apr. 16, 1940

2,197,016

UNITED STATES PATENT OFFICE 2,197,016

PRESERVATIVE FOR PHOTOGRAPHIC DEVELOPERS

William H. Wood, Bedford, Ohio, assignor to Harris-Seybold-Potter Company, Cleveland, Ohio, a corporation of Delaware No Drawing. Application May 11, 1939,
Serial No. 273,055

6 Claims. (Cl. 95—88)

This invention relates to photography, and more particularly to developers, such as for silver halide photographic materials; and it is among the objects of the invention to provide preservative characteristics for such developers and with improved features over known materials. As well-known, developing solutions commonly used, such for example as developers of "metol" (para-methylaminophenol sulphate) hydroquinone-sodium sulphite-sodium carbonate type, deteriorate rather rapidly, whether in use or idle, a few hours exposure to air being sufficient to cause a harmful extent of change. I have now found however that by combinations as pointed out more in detail hereinafter, developers and developing action may be had which avoid these well-known difficulties and make possible a much more extended developer action, and with particular practical advantages.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

I have found that a reaction product of morpholine, $HN(C_2H_4)_2O$, and sulphur dioxide, more fully described below, incorporated in suitable amounts in a developing solution, which may be of various known formulae, results in a solution having very distinctive and desirable properties.

For convenience, a suitable method of forming the reaction product referred to will now be described. Anhydrous sulphur dioxide is passed into anhydrous morpholine at a temperature below 120° C. and above the solidifying temperature of the morpholine, until absorption of sulphur dioxide in the amount of one-half mol of sulphur dioxide to each mol of morpholine has taken place. This reaction is accompanied by liberation of heat. The resulting product is then cooled to substantially room temperature, and thereafter sufficient water is added to cause rapid crystallization of the product as a mass of white crystals. Water added at the rate of one-half mol of water per each mol of morpholine is in general sufficient to bring about this result. If, instead of applying only one-half mol of sulphur dioxide to each mol of morpholine as above noted, the addition of the sulphur dioxide be continued until one mol of sulphur dioxide is absorbed per each mol of morpholine, the reaction product is also desirable. In adding such further amount of sulphur dioxide however, it is advisable to control the temperature below about 60° C. or low enough to avoid formation of resinous by-products but yet sufficiently high to maintain the morpholine in liquid form. The combining of the last portion of sulphur dioxide tends to proceed more slowly than the first portion. Either form of the reaction product, that is the one containing the half mol of sulphur dioxide or that containing the one mol of sulphur dioxide per each mol of morpholine, may be used, and in general a somewhat smaller quantity of the latter form of the product is required to produce the same preservative action in the developer, such smaller quantity being for instance on the order of about three-fourths.

Although the crystalline end product may be utilized without further treatment, it may be, and preferably is, purified by re-crystallization from an anhydrous alcohol such for instance as isopropyl alcohol. A noteworthy characteristic of the morpholine-sulphur dioxide reaction product resulting from preparation in this manner is its extremely high solubility in water. Any proportions of the reaction product may be employed which will produce the desired results, but for example I have found that one-tenth gram to two grams of such compound added to 100 cc. of the developer solution will produce excellent results. Developer solutions including such agent may be left exposed to the air for extended lengths of time without detriment, as contrasted with the rapid browning and deterioration which occurs with ordinary developing solutions. The speed of developing action, and the density developed for a given exposure, and other characteristics of the developer are not interfered with by the addition in accordance with my invention. An advantage further is that in accordance with my procedure the developer can be used until entirely exhausted in developing action, thus very materially reducing losses and costs.

As an example:

| | | |
|---|---|---|
| Metol | grams | 3.5 |
| Anhydrous sodium sulphite | do | 57 |
| Hydroquinone | do | 11.5 |
| Monohydrated sodium carbonate | do | 78 |
| Potassium bromide | do | 1.2 |
| Morpholine-sulphur dioxide reaction product | grams | 20 |
| Water | cc | 1000 |

Exposed films or plates are developed therein as usual. Such developer standing in the air shows no detriment and only a very light straw color in 24 to 48 hours exposure and maintains its full effectiveness as a developer, whereas the same developer without the reaction product of morpholine sulphur dioxide changes from a practically colorless condition to a very deep brown and becomes quite useless within twenty-four hours.

As another example:

| | | |
|---|---|---|
| Sodium sulphite | grams | 55 |
| Potassium bromide | do | 1.4 |
| Amidol | do | 5.5 |
| Morpholine-sulphur dioxide reaction product | do | 20 |
| Water | cc | 1000 |

As another example:

Solution A

| | | |
|---|---|---|
| Pyrogallol | grams | 9 |
| Metol | do | 8 |
| Potassium meta-bisulphite | do | 20 |
| Potassium bromide | do | 3.5 |
| Morpholine-sulphur dioxide reaction product | do | 20 |
| Water | cc | 1000 |

Solution B

| | | |
|---|---|---|
| Sodium carbonate | grams | 150 |
| Water | cc | 1000 |

For use equal amounts solutions A and B are mixed together.

As another example:

| | | |
|---|---|---|
| Paramidophenol hydrochloride | grams | 5 |
| Metol | do | 4 |
| Sodium sulphite | do | 250 |
| Salicylic acid | do | 0.5 |
| Borax | do | 5 |
| Glucose | do | 20 |
| Morpholine-sulphur dioxide reaction product | do | 20 |
| Water | cc | 1000 |

A surprising peculiarity found with developing solutions according to the present invention is that they lose water by evaporation more slowly than solutions not containing the morpholine-sulphur dioxide reaction product. Solutions thereby have a considerable advantage, particularly where large scale exposure is involved.

Other modes of applying the principle of the invention may be employed, change being made as regards the details described, provided the features stated in any of the following claims, or the equivalent of such, be employed.

I therefore particularly point out and distinctly claim as my invention:

1. In preparing photographic images, modifying a silver halide developer with a reaction product of morpholine with sulphur dioxide.

2. In preparing photographic images, dissolving a developing agent and an alkaline compound in water in proportions for desired developing action and incorporating a reaction product of morpholine with sulphur dioxide in proportion of about 0.1-2 gm. per each 100 cc. of solution.

3. In preparing photographic images, developing the image in the presence of a reaction product of morpholine with sulphur dioxide.

4. A photographic developer containing a developing agent, an alkaline compound, and a reaction product of morpholine with sulphur dioxide.

5. A photographic developer containing a developing agent and a reaction product of morpholine with sulphur dioxide.

6. A photographic developer containing a reaction product of morpholine with sulphur dioxide.

WILLIAM H. WOOD.